(12) United States Patent
Milde, Jr.

(10) Patent No.: US 6,892,979 B2
(45) Date of Patent: May 17, 2005

(54) VTOL PERSONAL AIRCRAFT

(76) Inventor: Karl F. Milde, Jr., 752 Union Valley Rd., Mahopac, NY (US) 10541

( * ) Notice: Subject to any disclaimer, the term of this patent is extended or adjusted under 35 U.S.C. 154(b) by 0 days.

(21) Appl. No.: 10/640,123

(22) Filed: Aug. 13, 2003

(65) Prior Publication Data

US 2004/0056154 A1 Mar. 25, 2004

Related U.S. Application Data

(63) Continuation-in-part of application No. 10/242,036, filed on Sep. 11, 2002.

(51) Int. Cl.⁷ .............................................. B64C 29/00
(52) U.S. Cl. ................................... 244/12.3; 244/12.1
(58) Field of Search .............................. 244/12.3, 12.4, 244/23 R, 23 D, 12.1, 23 C, 12.5, 218, 2

(56) References Cited

U.S. PATENT DOCUMENTS

| | | | | |
|---|---|---|---|---|
| 2,038,337 A | * | 4/1936 | Ballmann | 244/218 |
| 2,743,072 A | * | 4/1956 | Emmi | 244/218 |
| 3,162,401 A | * | 12/1964 | Hopwood | 244/207 |
| 3,265,329 A | | 8/1966 | Postelson | |
| 3,481,559 A | | 12/1969 | Apostolescu | |
| 3,559,921 A | * | 2/1971 | Timperman | 244/12.3 |
| 3,606,208 A | | 9/1971 | Postelson-Apostolescu | |
| 3,666,210 A | * | 5/1972 | Look et al. | 244/218 |
| 3,844,508 A | * | 10/1974 | Gioia et al. | 244/218 |
| 3,955,780 A | * | 5/1976 | Postelson | 244/12.3 |
| 4,471,928 A | | 9/1984 | Cole | |
| 4,691,881 A | | 9/1987 | Gioia | |
| 4,824,053 A | | 4/1989 | Sarh | |
| 5,115,996 A | | 5/1992 | Moller | |
| 5,454,531 A | | 10/1995 | Melkuti | |
| 5,758,844 A | | 6/1998 | Cummings | |
| 5,890,441 A | * | 4/1999 | Swinson et al. | 244/12.3 |
| 6,464,166 B1 | | 10/2002 | Yoeli | |

FOREIGN PATENT DOCUMENTS

WO    WO 03 029075 A2    9/2002

\* cited by examiner

Primary Examiner—Peter M. Poon
Assistant Examiner—Timothy D Collins
(74) Attorney, Agent, or Firm—Milde & Hoffberg, LLP

(57) ABSTRACT

Personal Aircraft capable of vertical take-off and landing ("VTOL") which comprises:

(a) a fuselage having a front end, a rear end and two lateral sides, the fuselage having a central longitudinal axis extending from the front end to the rear end, between the two lateral sides;

(b) at least one, and preferably two or more, ducted fans, each arranged in the fuselage between the front end and the rear end and between the two lateral sides, for providing vertical lift; and (c) at least one substantially horizontal wing attached to each side of the fuselage and extending outward with respect to the central longitudinal axis. The wings and fuselage of the aircraft are designed to provide a lift-to-drag (L/D) ratio during flight, when flying at an airspeed in the range of 50 to 100 MPH, of at least 4:1.

According to a preferred feature of the present invention, the width and wingspan of the aircraft wings are adjustable during flight so that the L/D ratio and the footprint of the aircraft may be matched to the needs of the pilot.

6 Claims, 3 Drawing Sheets

VTOL PERSONAL AIRCRAFT

CROSS-REFERENCE TO RELATED APPLICATION

The application is a continuation-in-part application of application Ser. No. 10/242,036 filled Sep. 11, 2002 entitled "VTOL PERSONAL AIRCRAFT".

BACKGROUND OF THE INVENTION

The present invention relates to so-called "Personal Aircraft" ("PAC™") which is capable of vertical take-off and landing ("VTOL"). Such an aircraft is operable to carry a relatively light payload (for example, 600 pounds which is the equivalent of two or three people) for short distances (for example, 250 miles) at relatively slow cruising speeds (for example, 50 to 100 MPH).

A Personal Aircraft of this type is disclosed in the International Patent Publication No. WO 03/029075 A2, which is incorporated herein by reference. It is characterized by the use of ducted fans, instead of rotary helicopter "wings", to generate lift while hovering. In this prior art design, a plurality of ducted fan units (each including an impeller and an engine, surrounded by a ducted fan tube) are arranged in the aircraft wings which extend outward in both directions on either side of the fuselage. At least one ducted fan unit is arranged on each side of the aircraft. Due to the wings, this aircraft has a relatively large "footprint", and cannot squeeze into small spaces during flight.

Another design of a Personal Aircraft is disclosed in the U.S. Pat. No. 6,464,166, which is incorporated herein by reference. This aircraft incorporates two ducted fan units, both in the fuselage, with their axes of rotation arranged along the centerline of the fuselage. This aircraft has no wings at all, so that it has an extremely small footprint and can fly through narrow passages, such as city streets. However, due to this absence of wings, the ducted fans must generate all of the lift to maintain the aircraft aloft. Consequently, this type of aircraft is not particularly fuel-efficient in transporting a payload from point A to point B.

Still another design of a Personal Aircraft is disclosed in the U.S. Pat. No. 5,454,531, which is incorporated herein by reference. This patent discloses a primary and two secondary (control) ducted fan units arranged in a fuselage. Short, stubby wings are arranged on opposite sides of the fuselage to provide lift during high-speed flight. This aircraft also includes a canard in front with trailing control surfaces and a horizontal stabilizer in back, also with a trailing control surface. In addition, the aircraft includes two rudders with vertical trailing control services.

Still another aircraft design is disclosed in the U.S. Pat. No. 5,115,996, which is incorporated herein by reference. This aircraft incorporates four ducted fans, two on each side of the fuselage in front and two on each side in the rear for both vertical and forward propulsion. Both the fuselage and the ducted fans are configured to jointly form an aerodynamic lifting body which cooperates with a horizontal stabilizer to provide aerodynamic lift to the aircraft in forward flight. As in the case with the aircraft disclosed in the aforementioned U.S. Pat. No. 5,454,531, this aircraft has an extremely low lift-to-drag (L/D) ratio at moderate speeds (below 100 MPH). This aircraft is designed for relatively high speeds (far in access of 100 MPH) and, as a result, it is not at all fuel efficient in traveling from point A to point B in the 50–100 MPH flight regime.

Several aircraft are known which incorporate wings of adjustable size. The U.S. Pat. No. 4,824,053 discloses an aircraft having wings which are telescopically extendable to adjust its wingspan (the distance from wingtip to wingtip). The U.S. Pat. No. 4,471,928 discloses an aircraft with wings which are telescopically adjustable in width. Both of these U.S. patents are incorporated herein by reference. According to the patents, both the length and contour of an aircraft wing can thus be adjusted to match the requirements of flight.

SUMMARY OF THE INVENTION

It is a principal object of the present invention to provide an advantageous design for a Personal Aircraft which enables the aircraft to take off, fly, and land in extremely confined areas, but which is extremely fuel efficient in transporting a payload from point to point.

This object, as well as other objects which become apparent from the discussion that follows, are achieved, in accordance with the present invention, by providing a Personal Aircraft capable of vertical take-off and landing ("VTOL") which comprises:

(a) a fuselage having a front end, a rear end and two lateral sides, the fuselage having a central longitudinal axis extending from the front end to the rear end, between the two lateral sides;

(b) at least one, and preferably two or more, ducted fans, each arranged in the fuselage between the front end and the rear end and between the two lateral sides, for providing vertical lift; and (c) at least one substantially horizontal wing attached to each side of the fuselage and extending outward with respect to the central longitudinal axis. The wings and fuselage of the aircraft are designed to provide a lift-to-drag (L/D) ratio during flight, when flying at an airspeed in the range of 50 to 100 MPH, of at least 4:1.

According to a preferred feature of the present invention, the wingspan of the aircraft is adjustable during flight so that footprint of the craft may be matched to the needs of the pilot. This wingspan adjustment is preferably effected by making the length of each wing telescopically extendable.

According to another preferred feature of the present invention, the width of each aircraft wing is adjustable during flight to match the wing airfoil to the speed of the aircraft. This wing width adjustment is also preferably effected by making the trailing edge of each wing telescopically extendable.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
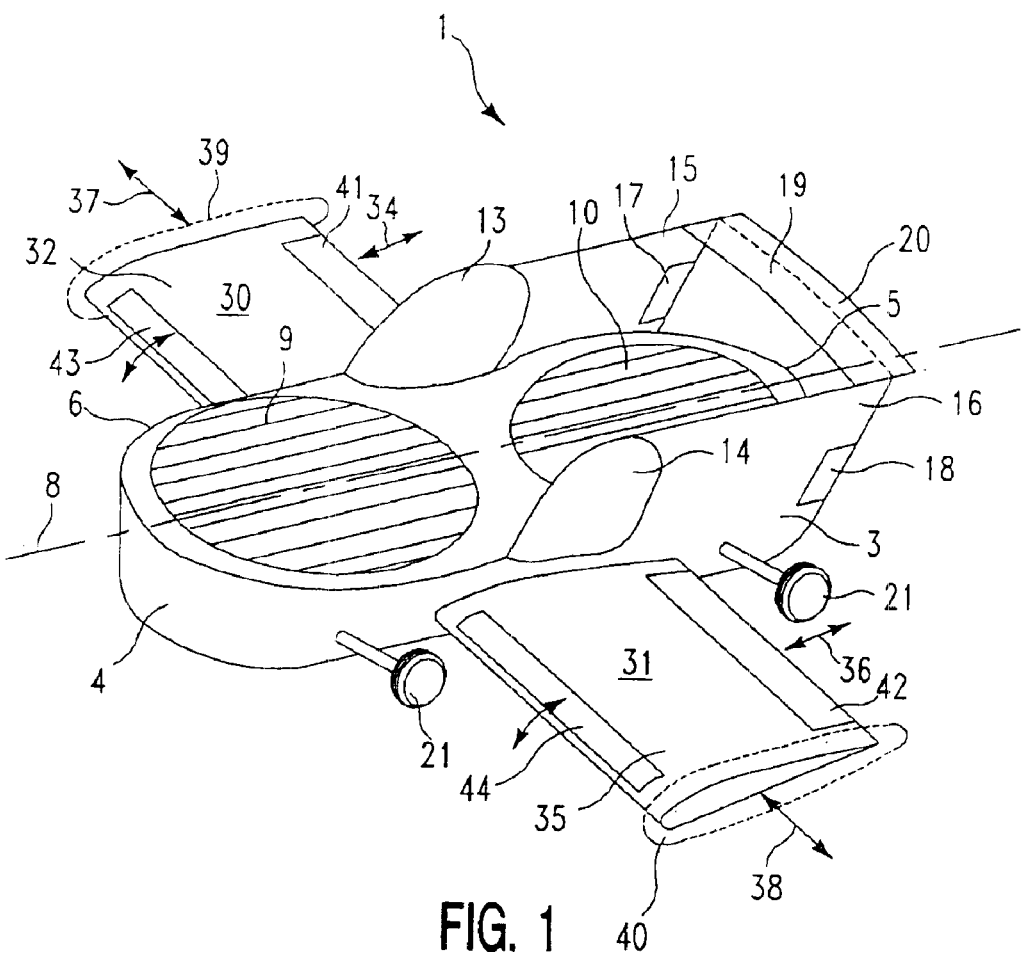
FIG. 1 is a perspective view of the preferred embodiment of a Personal Aircraft, according to the present invention, having wings which are adjustable in both length and width.
Figure 4:
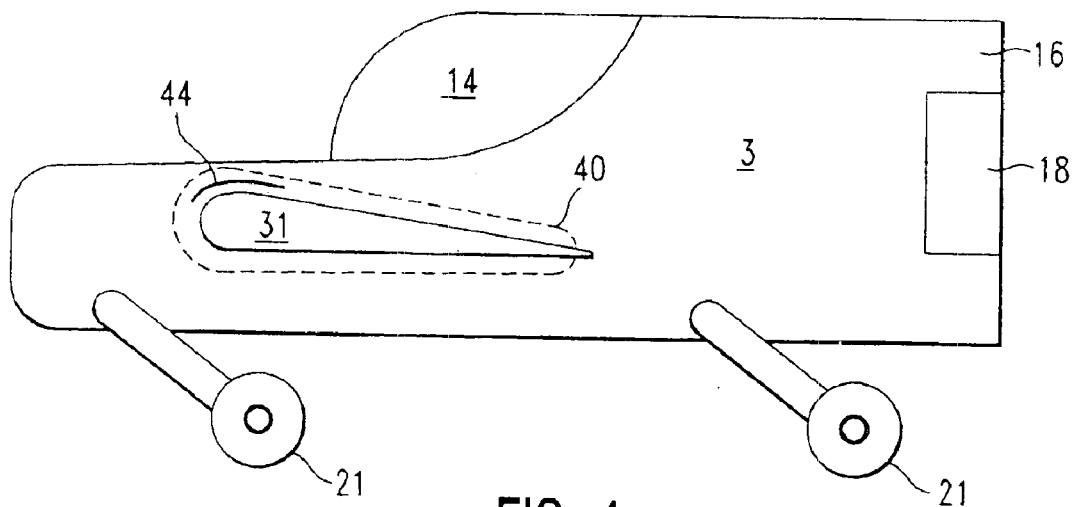
FIG. 4 is a side view of the aircraft illustrated in FIG. 1.
Figure 2:
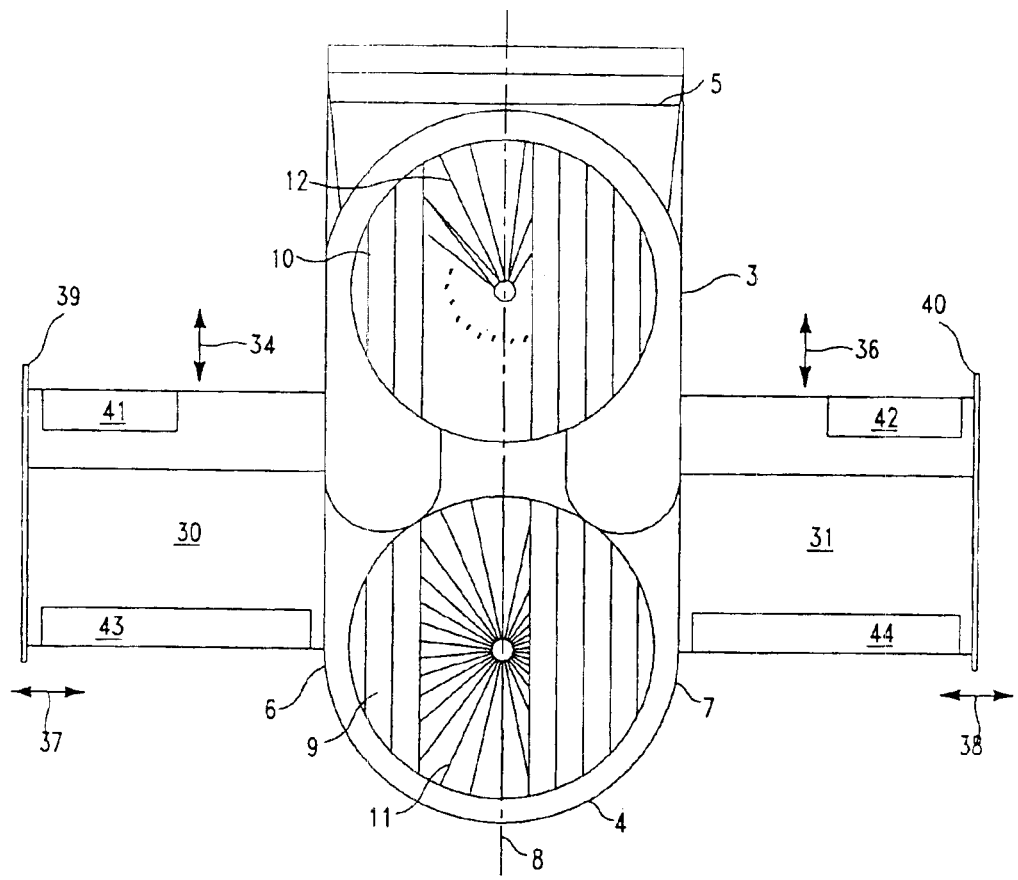
FIG. 2 is a top view of the aircraft illustrated in FIG. 1.
Figure 3:
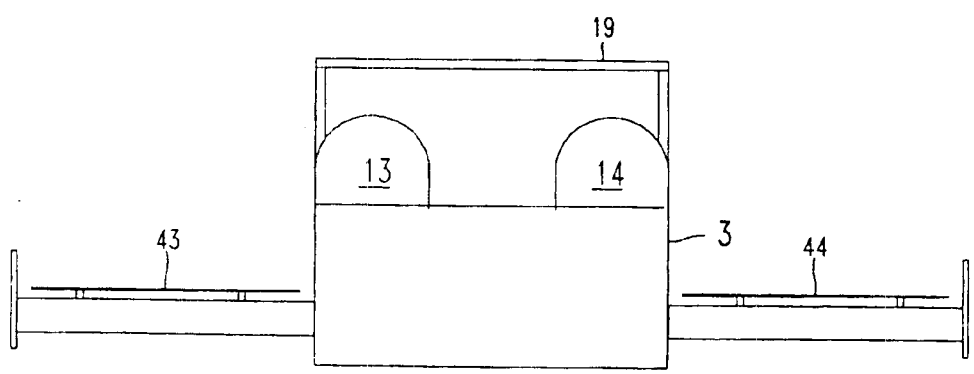
FIG. 3 is a front view of the aircraft illustrated in FIG. 1.

The preferred embodiments of the present invention will now be described with reference to FIGS. 1–6 of the drawings. Identical elements in the various figures are designated with the same reference numerals.

FIGS. 1–4 illustrate the preferred embodiment of the Personal Aircraft according to the present invention. This Personal Aircraft 1 comprises a fuselage 3 having a front end 4, a rear end 5 and two lateral sides 6 and 7, respectively. The fuselage has a central longitudinal axis 8 extending from the front 4 to the rear 5 between the two lateral sides 6 and 7.

Two ducted fan units 9 and 10 are arranged in the fuselage between the front end and the rear end and between the two lateral sides for providing vertical lift. The ducted fan units each include an impeller 11 and 12, respectively, which is rotatable about a substantially vertical impeller axis. This impeller axis intersects the central longitudinal axis 8 of the aircraft.

Details about the ducted fan units and their drive systems, as well as the louver control system of the aircraft, may be found in the aforementioned U.S. Pat. No. 6,464,166 and International Patent Publication No. WO 03/029075 A2.

As disclosed in the U.S. Pat. No. 6,464,166, the Personal Aircraft also includes cockpits 13 and 14 on opposite lateral sides of the fuselage which merge into vertical tail fins 15 and 16, respectively. Each of these tail fins has a control surface 17, 18, respectively, at its trailing edge.

Disposed between the tail fins is a horizontal stabilizer 19 with a control surface 20 at its trailing edge.

Landing gear is provided in the form of wheels 21, two on each lateral side of the fuselage. These wheels are supported by a suitable suspension system which cushions the shock of landing.

According to the invention, the Personal Aircraft is provided with at least one wing 30, 31 on each side of the fuselage. This wing is designed to provide a lift-to-drag (L/D) ratio during flight, when flying at an airspeed in the range of 50 to 100 MPH, of at least 4:1.

According to a preferred feature of the present invention, both the length and width of each wing is adjustable during flight so that the L/D ratio and the footprint of the aircraft may be matched to the needs of the pilot. In particular, for slow speed flight, the pilot may extend both the width and length of the wings to their maximum point to provide the needed lift at such speeds. For higher speeds, the width and length of the wings may be retracted to reduce the drag.

Also, the wingspan of the aircraft may be reduced to its minimum length during landing, or during flight through narrow spaces, such as along city streets.

Both the leading edge 32 and the trailing edge 34 of the wing 30 and the leading edge 35 and the trailing edge 36 of the wing 31 may be adjustable in accordance with the principles described in the aforementioned U.S. Pat. No. 4,471,928. The adjustment of the leading edge may be in the form of a separate shroud 43, 44, respectively, on each wing 30, 31, which is movable forward and back along the contour of the leading edge of the wing.

Similarly, the length of each wing 30 and 31 may be extended or retracted in the direction shown by the arrows 37 and 38 according to the principles disclosed in the aforementioned U.S. Pat. No. 4,824,053.

Preferably, the tips of each wing 30 and 31 are provided with a shroud 39 and 40, respectively, to inhibit the high-pressure air beneath the wing from circumnavigating the wing tip and reaching the low-pressure air above the wing. Such shrouds 39 and 40 provide increased performance and lift at slow speeds.

The trailing edge of each wing 30 and 31 is provided with a control surface 41 and 42, respectively, for control of the aircraft roll.

Figure 5:
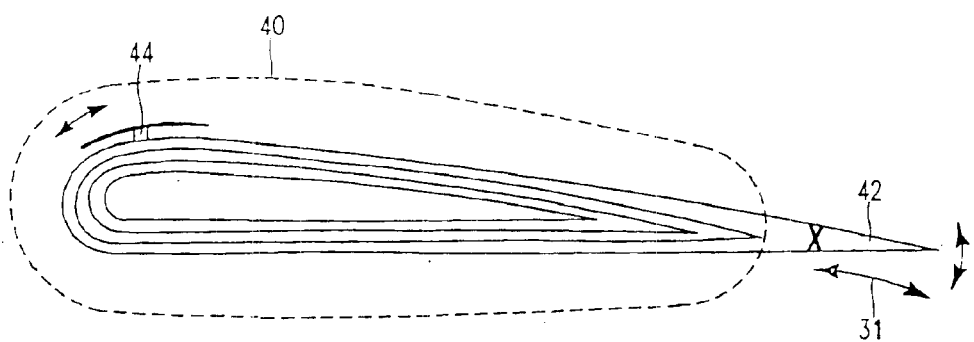
FIG. 5 is a cross-sectional view of a wing employed in the aircraft of FIGS. 1–4.
Figure 6:
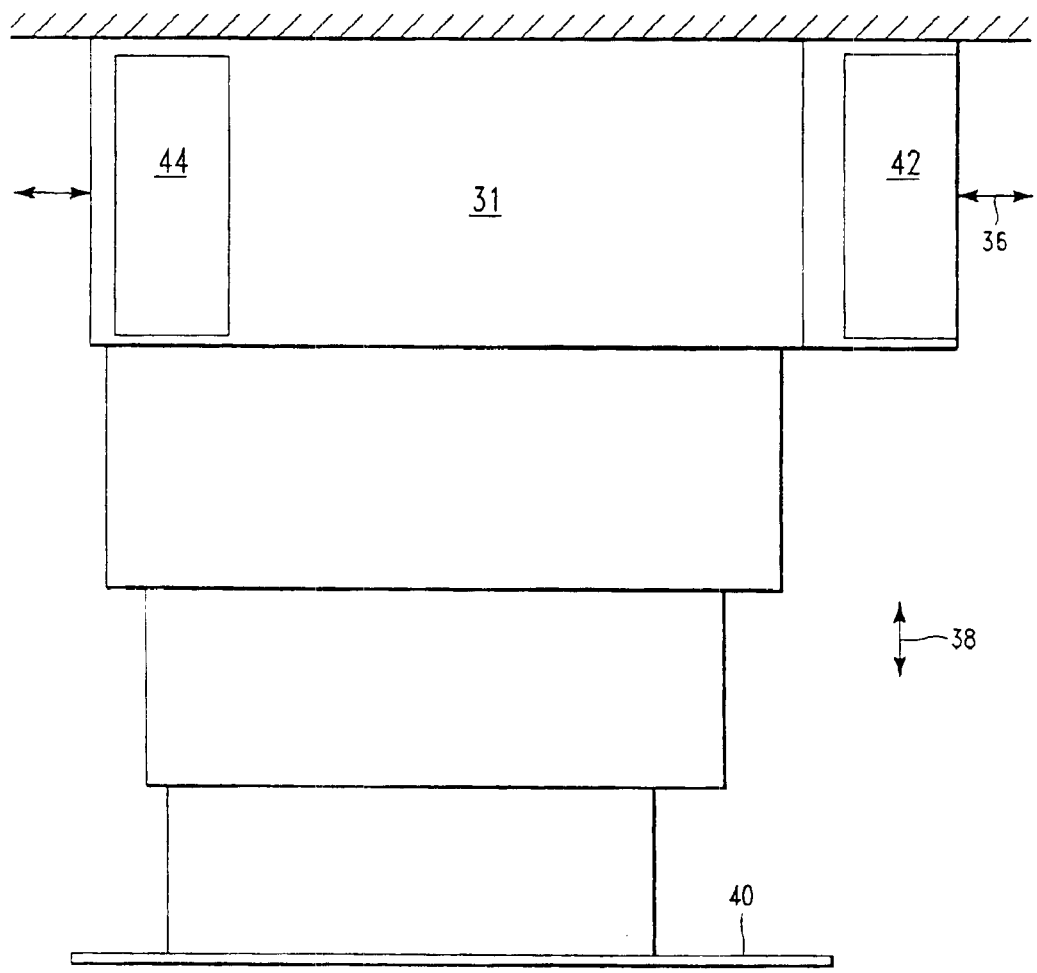
FIG. 6 is a top view of the wing of FIG. 5, telescopically extended to its maximum length.

FIGS. 5 and 6 illustrate the wing 31 in cross-section and top view, respectively. As may be seen, the wing is telescopically extendable in the manner described in the aforementioned U.S. Pat. No. 4,824,053. Also, the shroud 44 at the leading edge of the wing section closest to the fuselage, and also, if desired, the trailing edge with the control circuit 42 may be extended and retracted to adjust the wing for slow speed flight.

Of course, it is not necessary to have the wings 30 and 31 of the Personal Aircraft adjustable both in length and width. The wings 30, 31 may be adjustable only in length, or adjustable only in width.

There has thus been shown and described a novel VTOL Personal Aircraft which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A Personal Aircraft capable of vertical take-off and landing ("VTOL") and comprising, in combination:

(a) a fuselage with a passenger compartment for at least one person, having a front end, a rear end and two lateral sides, and having a central longitudinal axis extending from said front end to said rear end between said two lateral sides;

(b) at least one ducted fan, fixedly arranged in said fuselage between front end and said rear end and between said two lateral sides, for providing vertical lift at least as great as the weight of the aircraft; and (c) a substantially horizontal stationary wing attached to each lateral side of said fuselage and extending outward with respect to said central longitudinal axis, wherein said wings are extendable in length during flight and said wings, when extended, form at least one fixed wing for said aircraft, wherein the fixed wing and the fuselage provide a lift-to-drag (L/D) ratio of the aircraft during flight, resulting from forward motion of the aircraft through the air and excluding vertical lift provided by said ducted fan, of at least 4:1 when flying at an airspeed in the range of 50 to 100 MPH, whereby the wingspan of the aircraft may be adjusted during flight.

2. The Personal Aircraft defined in claim 1, wherein each said wing is telescopically extendable and retractable during flight.

3. The Personal Aircraft defined in claim 1, wherein each said wing is extendible in width during flight, thereby to adjust the lift-to-drag ratio of said wing to match the speed of the aircraft.

4. The Personal Aircraft defined in claim 3, wherein each said wing has a trailing edge, and wherein said trailing edge is telescopically extendable and retractable during flight.

5. The Personal Aircraft defined in claim 3, wherein each said wing has a leading edge, and wherein said leading edge is telescopically extendable and retractable during flight.

6. The Personal Aircraft defined in claim 1, wherein said at least one ducted fan includes at least two ducted fans arranged in said fuselage, said ducted fans each having an impeller which is rotatable about a substantially vertical impeller axis; and wherein the impeller axis of each ducted fan is arranged substantially along said central longitudinal axis.

\* \* \* \* \*